United States Patent [19]

Bullen et al.

[11] Patent Number: 4,701,270

[45] Date of Patent: Oct. 20, 1987

[54] NOVEL COMPOSITIONS SUITABLE FOR TREATING DEEP WELLS

[75] Inventors: Ronald S. Bullen; Joseph Mzik, both of Calgary; Jean P. Richard, Markham, all of Canada

[73] Assignee: Canadian Fracmaster Limited, Calgary, Canada

[21] Appl. No.: 829,924

[22] Filed: Feb. 18, 1986

[30] Foreign Application Priority Data

Feb. 28, 1985 [CA] Canada .................................. 475363

[51] Int. Cl.⁴ ............................................. E21B 43/26
[52] U.S. Cl. .................................. 252/8.551; 166/308; 528/405; 558/265
[58] Field of Search ..................... 252/8.551; 528/405; 558/265; 166/308

[56] References Cited

U.S. PATENT DOCUMENTS

| | | | |
|---|---|---|---|
| 3,664,422 | 5/1972 | Bullen | 166/308 X |
| 3,765,488 | 10/1973 | Pence | 166/308 |
| 3,842,910 | 10/1974 | Zingg et al. | 166/308 X |
| 3,953,383 | 4/1976 | Inoue et al. | 528/405 X |
| 3,954,626 | 5/1976 | Greminger et al. | 252/8.551 |
| 4,166,898 | 9/1979 | Kambe et al. | 528/405 |
| 4,500,704 | 2/1985 | Kruper et al. | 528/405 |

*Primary Examiner*—Herbert B. Guynn
*Attorney, Agent, or Firm*—Donald G. Ballantyne

[57] ABSTRACT

A viscosity-increased liquid carbon dioxide fracturing fluid is provided for the treatment of subterranean gas-bearing formations. The composition comprises liquid carbon dioxide which has been thickened by the addition of a small amount of a copolymer which is the reaction product of liquid carbon dioxide and an alkene oxide, preferably propylene oxide. The use of the copolymer thickener provides a $CO_2$ fracturing fluid which may be pumped at a high rate, will not readily boil or foam, will carry a propping agent and will completely degrade within the formation.

7 Claims, 2 Drawing Figures

CONSTANT TEMPERATURE (22°C) AND VARIOUS PRESSURES

NOVEL COMPOSITIONS SUITABLE FOR TREATING DEEP WELLS

BACKGROUND OF THE INVENTION

This invention relates broadly to the preparation of a novel thickened liquid carbon dioxide ($CO_2$) composition. More particularly, the invention is concerned with the use of a thickened liquid $CO_2$ compostion in the treatment of subterranean fluid-bearing formations to stimulate natural gas production.

Numerous methods are known in the industry for increasing the productivity of oil and gas wells in reservoirs having low permeability. A method now frequently employed is to inject liquid $CO_2$ into the subterranean formation adjacent the well bore. This liquefied gas, often containing a propping agent such as sand, enters the small fissures adjacent the well bore where it vaporizes and expands to fracture the formation thereby allowing trapped oil or gas to flow towards the well bore. U.S. Pat. No. 3,368,627, for example, describes the use of a mixture of liquefied $CO_2$ and a liquefied hydrocarbon such as propane as a fracturing fluid. In U.S. Pat. No. 3,310,112, the use of a gelled hydrocarbon slurry or emulsion in admixture with liquid $CO_2$ is proposed for the same purpose. U.S. Pat. No. 3,396,107 describes a fracturing composition consisting of a liquid $CO_2$ and water mixture. U.S. Pat. No. 3,623,552 describes a well displacement process wherein liquid $CO_2$ is injected into a formation in three phases or stages each phase having a different density. In U.S. Pat. No. 3,664,422, the use of liquid $CO_2$ in combination with a gelled alcohol is proposed for use in a well treating system. U.S. Pat. No. 3,765,488 discloses the use of a fracturing fluid comprising liquid $CO_2$ mixed with a gelled alcohol, using a specific hydroxyalkyl cellulose gelling agent. In U.S. Pat. No. 3,842,910, a particular well-treating method making use of liquid $CO_2$ is described. U.S. Pat. No. 3,954,626 provides a well-treating composition comprising liquid $CO_2$, alcohol and a hydroxy-propyl methylcellulose gelling agent.

While all of the above noted inventions are meritorious, none has completely alleviated the problems associated with the use of liquid $CO_2$ as a well-fracturing fluid. Although liquid $CO_2$ is a near ideal fracturing fluid, since it vaporizes in situ, it nevertheless has a very low viscosity and, hence, must be combined with, for example, a gelled alcohol or similar material in order to support a propping agent and to provide a suitable fracture width. The presence of, for example, hydroxyalkyl cellulose thickening agents, however, often result in the deposit of an undesirable residue in the rock fissures. Furthermore, hydroxyalkyl cellulose thickeners are crosslinked only with difficulty and many species are not compatible with liquid $CO_2$ Foaming of the liquid mixtures during pumping may also present problems when such thickeners are present. The description "thickened liquid $CO_2$" found in the prior patent literature tends to be misleading since it is the alcohol which is gelled or thickened and which is then diluted by the presence of the liquid $CO_2$. What is required in the industry is a well-fracturing fluid which is sufficiently viscous to be delivered under pressure into a subterranean formation at a high pumping rate, which will not boil or foam during pumping, which carries a suspended propping agent without difficulty and which will completely degrade in the underground location without leaving any interfering solid or liquid residues in the formation.

SUMMARY OF THE INVENTION

The present invention provides a novel composition of the type suitable for use for treating subterranean formations to stimulate production of gas. The novel composition comprises a mixture of liquid $CO_2$ and the reaction product of liquid $CO_2$ and an alkene oxide, particularly, propylene oxide. Liquid $CO_2$, when reacted with, for example, propylene oxide in the presence of a catalyst under controlled conditions of temperature and pressure yields a product described by the following reaction:

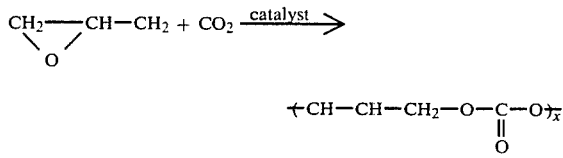

The product of the reaction is indentifiable as an alternating or random copolymer having molecular weights of from 20,000 to 150,000 which may be characterized as an apparent polycarbonate since infra-red spectra reveals the presence of interspersed carbonate linkages. The presence of from about 1.5% to 3.5% by weight of this reaction product in liquid $CO_2$ provides a significant increase in the viscosity of the liquid $CO_2$ and consequently results in a substantially improved liquid $CO_2$ fracturing fluid. In addition, the reaction product decomposes at ambient temperature and pressure in 24–48 hours, and at substantially higher rates in the hot underground environment in gas wells, and hence leaves no undesirable residue in the substerranean formation.

DESCRIPTION OF PREFERRED EMBODIMENTS

In a preferred embodiment of the invention, the increased viscosity fracturing fluid is prepared at the point of use, that is, close to the well head. The ingredients of the fracturing fluid, namely, commercially available liquid $CO_2$, commercially available alkene oxide, preferably propylene oxide, and a catalyst solution are combined in an appropriate temperature controlled, closed vessel where after mild agitation they are left to stand for up to 16 hours. During this period, the reaction between propylene oxide and carbon dioxide proceeds to produce the viscosity-increasing copolymer reaction product which is dispersed throughout the liquid $CO_2$. In order to encourage the production of a lower molecular weight, viscosity-increasing, liquid copolymer, the reaction temperature is maintained below 0° C. At higher temperatures approaching 20° C., a higher molecular weight, solid, crystal-like, substantially insoluble product having a high number of carbonate units tends to be produced. After 16 hours, the liquid $CO_2$ fracturing fluid containing the liquid copolymer exhibits an increase in viscosity, a decrease of about 10% in vapor pressure, and a change in critical temperature compared with unreacted, liquid $CO_2$.

The liquid $CO_2$ employed is a high quality commerical grade available in cylinder or pressure tank quantities. The alkene oxide used is a regular commercial grade of propylene oxide. While both ethylene oxide and butylene oxide will also react with liquid $CO_2$ to produce a viscosity-increasing copolymer, the thickening achieved is found to be less practical than when propylene oxide is employed. The preferred catalysts are diethylzinc and acetic acid anhydride. These catalysts, which may be used alone or in combination, are dissolved in a suitable solvent, for example, benzene, 1,4-dioxane or hexane. The inclusion of a material which improves the reaction yield but which by itself does not readily promote the reaction, is desirable. Such an enhancer material or co-catalyst is a multi-valent salt of acetic acid, such as, for example, zinc acetate or cobalt acetate. A preferred combination of catalyst and co-catalyst is acetic acid anhydride and zinc acetate in a ratio of 33 parts by weight of catalyst to 1 part by weight of co-catalyst in 1,4-dioxane solvent.

Preferred reaction mixtures comprise the following range of ingredients:

|  | % by Weight |
| --- | --- |
| Liquid Carbon Dioxide | 96.5–98.5 |
| Alkene Oxide | 1.3–2.6 |
| Solvent | 0.1–0.2 |
| Catalyst | 0.1–0.2 |
| Co-Catalyst | 0.003–0.006 |

Figure 2:
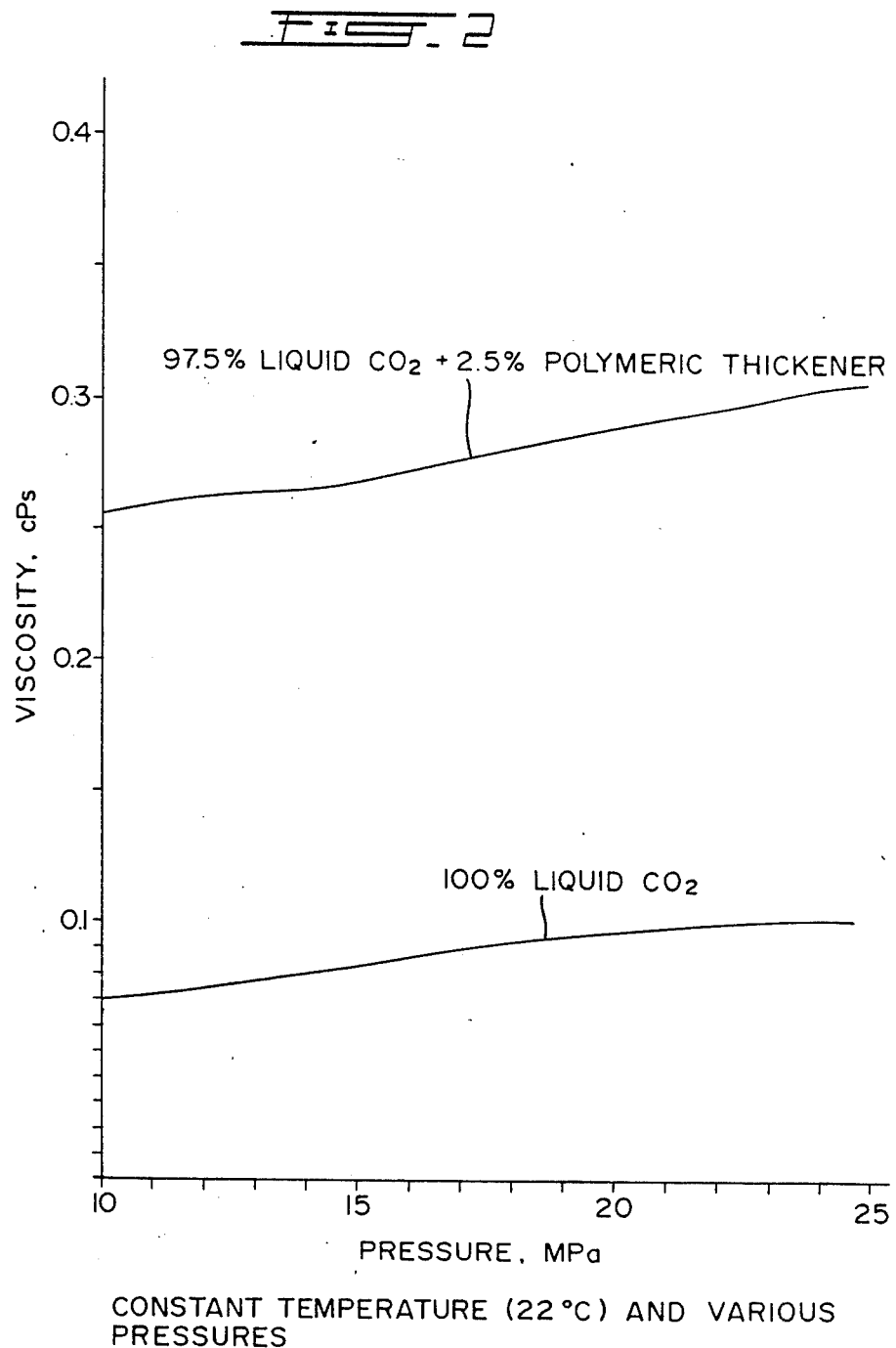
FIG. 2 is a graph showing the comparative viscosities of pure liquid $CO_2$ and a typical fracturing fluid of the invention.

Referring to FIG. 2 of the drawings, a graphical comparison is made between the viscosity, at various pressures of a pure, liquid $CO_2$ and the viscosity-increased liquid $CO_2$ fracturing fluid of the present invention. As can be seen at all temperatures depicted, the $CO_2$ fracturing fluid of the invention demonstrates an increase in viscosity.

Figure 1:
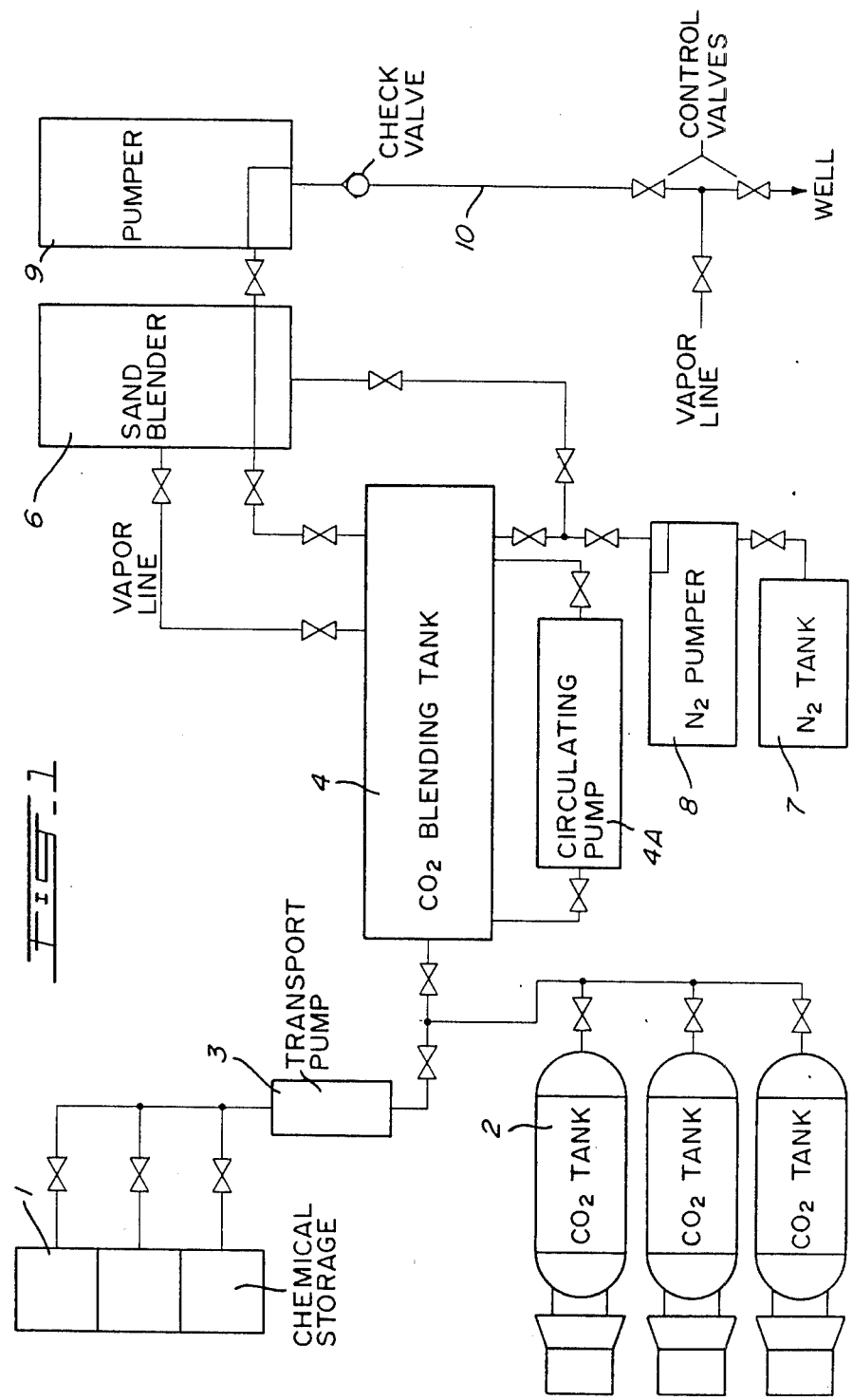
FIG. 1 is a schematic illustration of a well fracturing system employing the fracturing fluid of the invention.

Referring to FIG. 1 of the drawings, a simplified suggested typical arrangement is shown for use in the field close to the well site. All of the various vessels and components shown may be mounted upon one or more transport vehicles. A tank 1 provides storage for a mixture of alkene oxide, solvent, catalyst and co-catalyst. Liquid $CO_2$ is stored in vessels 2 at a temperature and pressure of about $-30°$ C. and 14000 gms/sq. cm. A pump 3 is provided to deliver the solvent/catalyst mixture from tank 1 to the liquid $CO_2$ blending tank 4. A circulating pump 4A is provided to achieve mixing of the contents of tank 4. Proppant material, such as silica sand of appropriate mesh size, is stored in sand vessel 6. Preferably, the sand in vessel 6 is maintained under pressurizing and cooling conditions using some liquid $CO_2$ as the coolant as disclosed by Bullen and Lillies in Canadian patent No. 1,134,258 granted Oct. 26, 1982. Liquid nitrogen is provided in tank 7. Nitrogen gas is normally injected into the well bore to purge and cool the system and to create an initial fracture. It may also, in some cases, be desirable to provide a blended $CO_2/N_2$ fracturing fluid. A liquid nitrogen pump is shown at 8. A principal high pressure pump 9 is provided to deliver the increased viscosity, liquefied $CO_2$ or $CO_2/N_2$ blend, with or without added sand proppant, through delivery line 10.

Before the actual fracturing process is begun a measured amount of alkene oxide/catalyst/co-catalyst/solvent mixture is delivered from storage tank 1 to $CO_2$ blending tank 4. Thereafter, blending tank 4 is filled with $CO_2$ vapor (8788 gms/sq.cm.) and this is followed by the charging of tank 4 with the appropriate ratio of liquid $CO_2$. The alkene oxide/$CO_2$/catalyst/solvent mixture in tank 4 is circulated through pump 4A for a short time. The mixture is then allowed to rest for a period of approximately 16 hours in order to allow the reaction between the alkene oxide and $CO_2$ to proceed to produce a high molecular weight polymeric reaction product. As the polymeric reaction product is produced, its presence causes a significant increase in the viscosity of the liquid $CO_2$. This increased viscosity is demonstrated in FIG. 2 wherein a comparison is shown between the viscosity of pure liquid $CO_2$ and the viscosity of the thickened liquid $CO_2$ fracturing fluid of the present invention.

To begin the fracturing process, the thickened liquid $CO_2$ in tank 4 is pressured up to about 21,000–25,000 gms/sq.cm., that is, substantially above equilibrium pressure. This pressure ensures the delivery of the liquid $CO_2$ to pump 9 despite any pressure drop or temperature increase between tank 4 and pump 9. At pump 9 the thickened, liquid $CO_2$ is pressurized to about 246,000–35,000 gms/sq.cm., which is the usual wellhead injection pressure. The liquid, thickened $CO_2$ is pumped through line 10 into the well bore (not shown) where it is forced laterally into the formation adjacent the bore. As pumping is continued, the temperature of the line 10, the well bore and the surrounding formation is reduced and vaporization of the liquid $CO_2$ is minimized. Fracturing takes place when the high pressure fluid is injected into the formation. When pumping is stopped, the pressure and temperature of the liquid $CO_2$ rise to that of the surrounding formation and the $CO_2$ is converted to a volatile gas. Its volume is thereby increased and further fracturing results. The gaseous $CO_2$ is dissipated into the formation or is exhausted up the well bore where it may be collected.

If it is desired to add a portion of the cooled, pressurized sand proppant from tank 6 into the stream of fracturing fluid, the proppant material may be continuously proportioned into the fluid stream by known means, for example, by a feed auger. When present, the proppant is carried into the formation fractures by the liquid $CO_2$. When the $CO_2$ is volatilized, the proppant material is deposited and the fractures are held open.

Because of the unique nature of the liquid $CO_2$ viscosity-increasing copolymer, no undesired residue is left behind when the liquid $CO_2$ and thickener eventually gasify due to the formation heat.

EXAMPLE

A gas well in Grand Junction, Colo., U.S.A., was fractured using the fracturing fluid of the present invention. A fluid was prepared consisting of 98.25% by weight of liquid $CO_2$ and 1.75% by weight of propylene oxide/acetic acid anhydride/zinc acetate/1,4-dioxane solvent mixture. The total mixture was allowed to stand for 16 hours and 450 cubic meters of the resultant, thickened $CO_2$ was pumped down the well bore together with added sand proppant material. When gas production was resumed the production rate was 7.5 mcf/day. Prior to fracturing, the rate was 0.5 mcf/day.

We claim:

1. An anhydrous deep well fracturing composition which comprises liquid carbon dioxide thickened with from 1.5% to 3.5% by weight of the total composition of the reaction product of an alkene oxide of 2-4 carbon atoms and liquid carbon dioxide the said reaction product being a viscosity-increasing liquid copolymer having a molecular weight of from 20,000 to 150,000.

2. A process for preparing a fracturing composition as claimed in claim 1 comprising reacting liquid carbon dioxide with an alkene oxide of 2-4 carbon atoms in the presence of a catalyst selected from the group consisting of diethylzinc and acetic acid anhydride dissolved in a carried liquid.

3. A process as claimed in claim 2 wherein the reacting mixture also contains a co-catalyst selected from one or more multi-valent salt of acetic acid.

4. A process as claimed in claim 3 where the weight ratio of catalyst to co-catalyst is 33:1.

5. A process as claimed in claim 2 wherein the carrier liquid is selected from the group consisting of benzene, 1,4-dioxane and hexane.

6. A fluid fracturing composition for a subterranean formation which composition comprises from 96.5% to 98.5% by weight of liquid carbon dioxide thickened with from 1.5% to 3.5% by weight of the reaction product of an alkene oxide of 2-4 carbon atoms and liquid carbon dioxide the said reaction product being a viscosity-increasing liquid copolymer having a molecular weight of from 20,000 to 150,000.

7. A fracturing composition as claimed in claim 6 also containing a proppant.

* * * * *